United States Patent [19]

Duclos et al.

[11] Patent Number: 5,771,755
[45] Date of Patent: Jun. 30, 1998

[54] DAMPED FLYWHEEL ADAPTED TO BE INTERPOSED IN A MOTOR VEHICLE PROPULSION UNIT

[75] Inventors: Didier Duclos, Ozoir La Ferriere; Jacques Feigler, St. Brice S/Foret, both of France

[73] Assignee: Valeo, Paris, France

[21] Appl. No.: 604,955

[22] PCT Filed: Jun. 30, 1995

[86] PCT No.: PCT/FR95/00877

§ 371 Date: Feb. 28, 1996

§ 102(e) Date: Feb. 28, 1996

[87] PCT Pub. No.: WO96/00860

PCT Pub. Date: Jan. 11, 1996

[30] Foreign Application Priority Data

Jun. 30, 1994 [FR] France .................................. 94 08257

[51] Int. Cl.[6] ........................... F16F 15/139; F16F 15/167
[52] U.S. Cl. ..................... 74/574; 192/55.61; 192/70.17; 192/214.1; 464/7; 464/67; 464/68
[58] Field of Search .......................... 74/574; 192/30 V, 192/70.17, 55.61, 213.12, 213.22, 213.31, 214.1, 113.5; 464/7, 24, 64, 67, 68

[56] References Cited

U.S. PATENT DOCUMENTS 5,273,372  12/1993  Freidmann et al. .................. 74/574 X

FOREIGN PATENT DOCUMENTS

| A-2 687 442 | 8/1993 | France . |
| A-2 695 579 | 3/1994 | France . |
| U-79 26142 | 3/1981 | Germany . |
| A-3721712 | 1/1988 | Germany . |
| A-2219647 | 12/1989 | United Kingdom . |
| A-2251284 | 7/1992 | United Kingdom . |
| A-2269440 | 2/1994 | United Kingdom . |

*Primary Examiner*—Richard M. Lorence
*Attorney, Agent, or Firm*—Longacre & White

[57] ABSTRACT

A damped flywheel (10) of the type comprising a first rotating element (12) and a second rotating element (14), which are coaxial and which have the general form of parallel plates (20, 26), and which define between them an annular housing (30) which receives a resilient damping device (32), together with an annular space which receives a friction damping device (58), and of the type comprising two coaxial sealing rings (56A, 56B), in which the friction damping device (58) comprises a part (62) which is driven in rotation by the second rotating element (14) through a head (68) of a member (66) that fastens one (56A) of the sealing rings (56A, 56B) on an annular disc (42) of the second rotating element (14).

10 Claims, 2 Drawing Sheets

DAMPED FLYWHEEL ADAPTED TO BE INTERPOSED IN A MOTOR VEHICLE PROPULSION UNIT

This is an National Application of PCT International Application No. PCT/FR95/00877 filed on Jun. 30, 1995.

BACKGROUND OF THE INVENTION

1. Field of the Invention

The present invention relates to a damped flywheel arranged to be interposed operatively between two rotating assemblies, one of which is coupled to the internal combustion engine of a propulsion unit, especially for a motor vehicle, the other one being coupled to the input shaft of the gearbox of the said propulsion unit.

2. Description of Related Art

In particular, the invention relates to a damped flywheel of the same type as that described and shown in the document FR-A-2 687 442, which comprises a first rotating element and a second rotating element, which are coaxial with each other and have the general form of parallel plates that define between them a sealed annular housing, which is delimited mainly by the first rotating element and which is disposed radially towards the outside and receives a resilient damping device and a lubricating agent, such as grease, for the said device together with an annular space which is located radially towards the inside and which receives at least one friction damping device.

The resilient damping device works circumferentially between the two rotating elements, while the friction damping device works axially between the two rotating elements and is arranged in the region of the bearing, such as a ball bearing or a plain bearing, which is interposed radially between the two rotating elements which usually consist of masses, so as to mount them for rotation of one with respect to the other.

It is desirable to lubricate the different components of the resilient damping device, and in particular the springs with their support zones, and it has previously been proposed, for this purpose, to arrange the annular housing, which receives the resilient damping device, in such a way that it is sealed, and to separate it from the annular space that receives the friction damping device, so that it can contain a lubricating agent which is unable to penetrate radially inwardly between the two rotating elements, and so that it will not affect proper operation of the complementary friction damping device which is arranged in the annular space between the two rotating elements.

In order to ensure that the housing is sealed radially inwardly, it has previously been proposed, in the document DE-U-79.26142, to provide sealing means which comprise two coaxial sealing rings, one of which is in engagement through one of its faces against a first support surface associated with the first rotating element, and through its other face against a second support surface associated with the second rotating element.

In the embodiment proposed in that document, each of the support surfaces is defined by an annular O-ring seal which is arranged in an annular groove machined for this purpose in a surface portion, in facing relationship, of either one of the two rotating elements, and eachring is retained radially by simple frictional contact of its opposed faces with the two corresponding O-rings.

The arrangement of the sealing means proposed in that document is particularly complex and costly, because it calls for numerous components and makes it necessary to arrange for machining of grooves of precise dimensions for the O-ring seals, and because the assembly of the different components in such a way as to ensure correct positioning of the rings between their corresponding O-ring seals is particularly difficult, both to carry out and to arrange to be done automatically.

In order to overcome these drawbacks, it has previously been proposed, in the document FR 93 15571 filed on 23 Dec., 1993 and not published at the present time, that each ring should be mounted in axial compression between its two support surfaces and be arranged to engage radially, through one of its circular edges, against a shoulder formed in facing relationship with it on one of the two rotating elements.

Such an arrangement is satisfactory, especially in that it enables the radial size to be limited towards the interior of the sealing rings and enables two concentric friction damping devices to be used, but the fitting of the rings and the assembly of the different components are not as easy to carry out as is desirable, since the rings are not retained in any way with respect to the various components until final assembly.

SUMMARY OF THE INVENTION

An object of the present invention is to provide a damped flywheel of the type mentioned above, in which the structure of the sealing means for the annular housing is particularly simple and, in particular, enables the fitting of the rings and the assembly of the various components to be simplified.

To this end, the invention proposes a damped flywheel, characterised in that the friction damping device comprises a part which is driven in rotation by the second rotating element through at least one interposed head of a member for fastening one of the sealing rings on to the annular disc of the second rotating element, and in that the said disc is fixed on the second rotating element by means of a set of coupling members which are distinct from the fastening members.

Thanks to the invention, the disc of the second rotating element constitutes, with its associated sealing ring, an assembly which can be handled and transported, and which cannot be lost, thus facilitating a reduction in the storage of components and facilitating the fitting of the damped flywheel. This assembly also enables errors to be eliminated, as regards the fitting of the sealing ring.

In addition, the sealing ring is improved because it is not secured by means of the coupling members. In addition, the fastening member has a cost-saving double function which enables the fastening of the disc to be improved, so making the damped flywheel very robust.

The second rotating element is preferably recessed in order to avoid any interference with the feet of the fastening members.

The fastening members also, preferably, enable the second sealing ring to be secured to the disc of the second rotating element, the said second sealing ring being gripped between the disc and the feet of the fastening members.

It is thus possible to make a sub-assembly consisting of the disc and the sealing rings, and to carry out final assembly without difficulty.

In accordance with further features of the invention:

the second rotating element comprises an annular disc which extends into the interior of both the annular space and the annular housing, and of which the opposed annular faces constitute the said second support surfaces, the fastening member being mounted on the annular disc;

the fastening member is, simply and cheaply, a rivet; this rivet has a widened head for driving the appropriate part of the friction damping device;

an internal radial edge of the said sealing ring is gripped between the head of the fastening member and the second support surface with which it cooperates;

the body of the fastening member extends through the internal radial edge of the said sealing ring;

a set of members, spaced apart circumferentially, are provided so as to fasten the said sealing ring, and their heads drive in rotation the second part of the friction damping device;

the annular disc is fixed to the second rotating element in the form of a plate, by means of a set of coupling members which are spaced apart circumferentially;

the coupling members and the fastening members are arranged substantially on a common pitch circle, and are distinct from each other;

the other one of the two sealing rings may be fixed on the second rotating element;

the internal radial edge of the said other sealing ring is gripped between the annular disc and a support surface formed on the second rotating element;

the coupling members are rivets.

BRIEF DESCRIPTION OF THE DRAWINGS

Further features and advantages of the invention will appear on a reading of the following detailed description, for an understanding of which, reference is made to the attached drawings, in which.

DETAILED DESCRIPTION OF PREFERRED EMBODIMENTS

Figure 1:
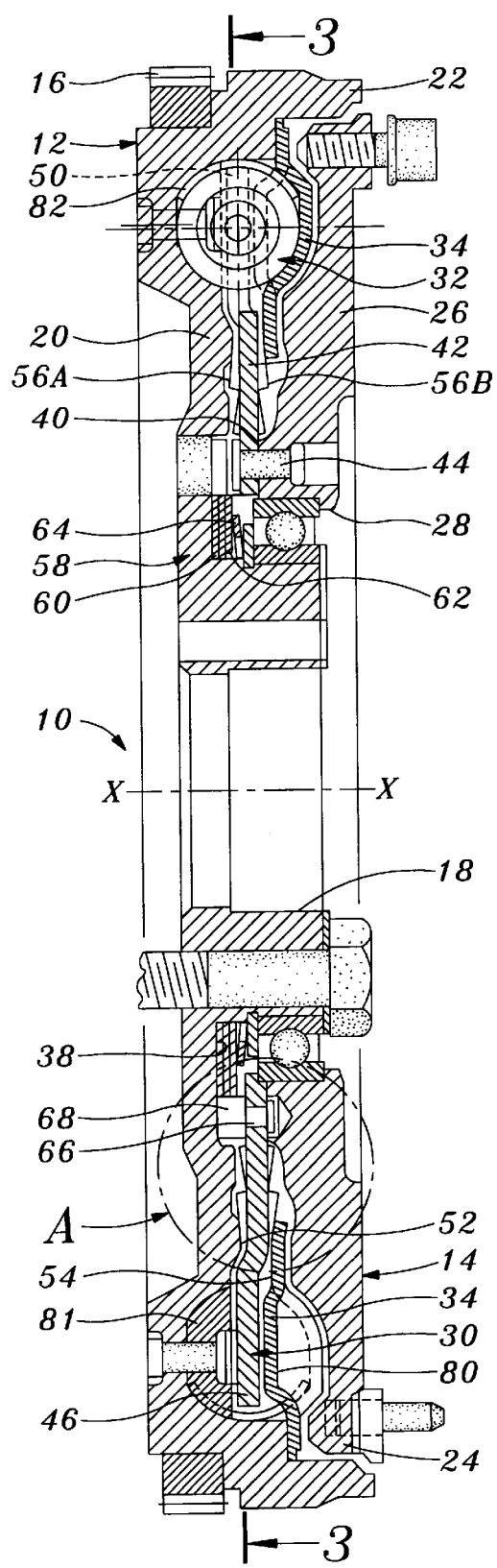
FIG. 1 is a view in axial cross section taken on the line 1—1 in FIG. 3, of one embodiment of a damped flywheel in accordance with the invention.
Figure 3:
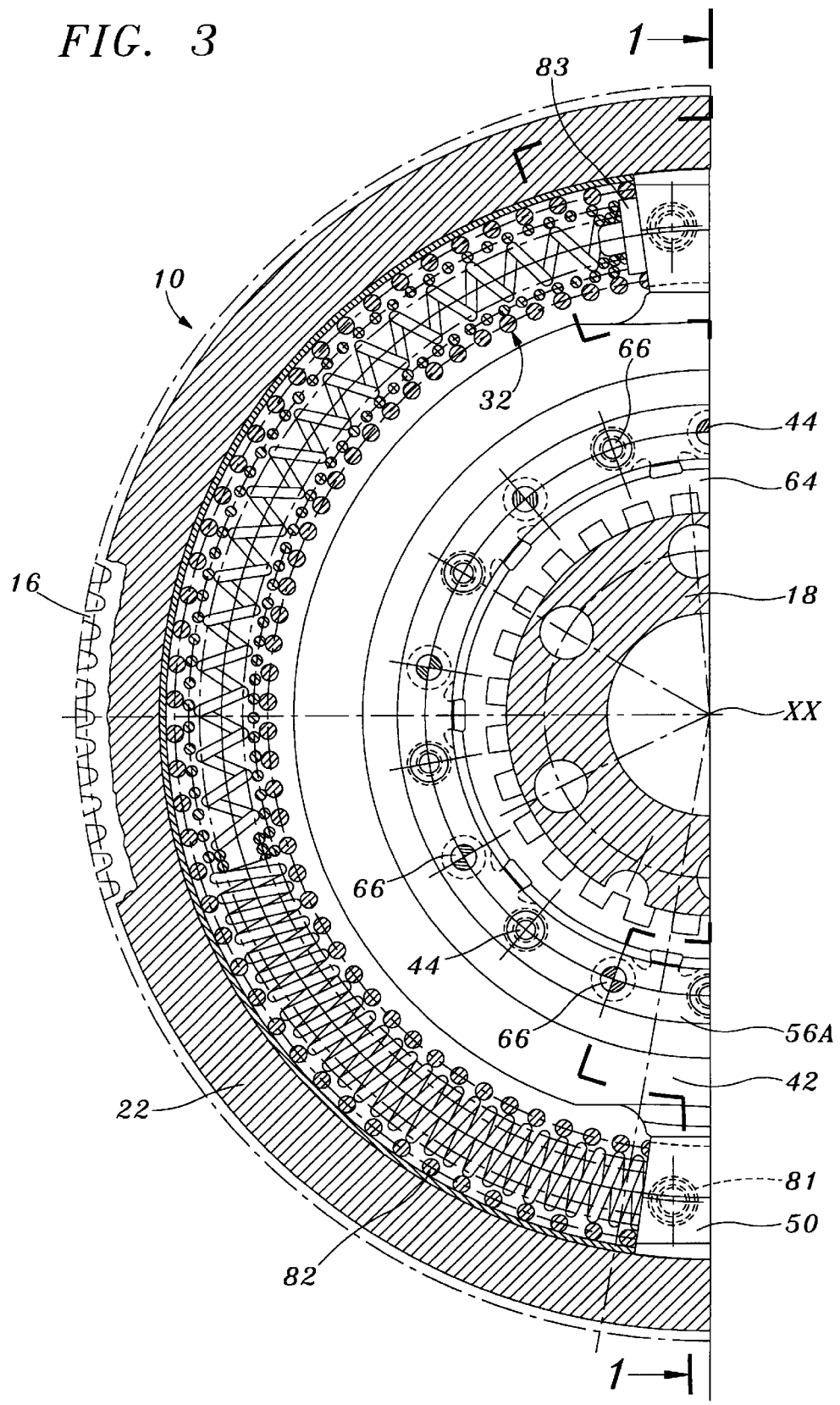
FIG. 3 is a partial front elevation, showing, partly in cross section taken on the line 3—3 in FIG. 1, the damped flywheel shown in that Figure.

FIGS. 1 and 3 show a damped flywheel 10 which consists essentially of a first rotating element 12 and a second rotating element 14, which are arranged for rotation of one with respect to the other about an axis X—X.

The rotating elements 12, 14 consist in this case, in a manner known per se, of coaxial masses which are mounted for movement of one with respect to the other, against the action of a circumferentially acting resilient damping device 32 and an axially acting friction damping device 58.

The first element 12, which in this example is in the general form of a plate, comprises a toothed outer crown 16 which is arranged to cooperate with a starter of the propulsion unit (not shown), and a central hub 18 which is made in one piece with the plate 12 and which is arranged to be fixed on the end of a crankshaft of the engine (not shown).

The rotating element 12 consists essentially of a plate 20 and an axially oriented, peripheral, cylindrical annular skirt portion 22, which partially surrounds a peripheral cylindrical annular skirt portion 24 that forms an axial extension of the main portion, in the form of a plate 26, of the rotating element 14, which is mounted for rotation on the hub 18 through, in this example, an interposed ball bearing 28, or in a modified version another bearing which is for example of the plain bearing type.

The plates 20, 26 of the skirt portions 20 and 24 delimit an annular housing 30 which is arranged to receive, in accordance with a known design, the resilient damping device 32 that consists of an assembly of helical springs, which are concentric in this example and which are arranged in the form of a crown.

The said housing 30 is in this example defined mainly by the plate 20, the skirt portion 22 and a disc 34 of the first rotating element 12.

At its inner periphery, this housing leaves open a slight slot into which there penetrates a disc 42 of the second rotating element 14, which is sealed in a manner to be described later herein.

The first rotating element 12 also includes the internal radial disc 34 which extends radially inwardly from the skirt portion 22 between the two plates 20, 26, towards an annular space 36 which is defined between the flat surface portions 38 and 40, in facing relationship to each other, of the plates 20 and 26.

The disc 34 is coupled in rotation to the outer skirt portion 22 by being sealingly seamed to it, as described in the document FR-A-2 687 442. For this purpose, the skirt portion has a groove which is arranged to receive the metal of the metallic disc 34, while the latter is being seamed into place.

In another version, this sealed fastening may be obtained by screw fastening, as described in the document FR-A-2 687 442. In a modified version, riveting or welding may be used. The said disc 34 partly delimits the housing 30, the plate 26 being recessed so as to accommodate the disc 34, which is embossed locally at 80 as can be seen in FIG. 1, so as to provide an abutment for the circumferential ends of the helical springs of the device 32.

In facing relationship with these embossed portions 80, the plate 20 carries pads 81 which are secured by riveting (as can be seen in the lower part of FIG. 1), for engagement by the circumferential ends of the said springs.

The second rotating element 14 further includes an internal disc 42 which is coupled in rotation to it by means of rivets 44, and which extends radially into the annular space 36 and into the annular housing 30.

The second rotating element 14 constitutes, by virtue of its plate 26 and in a manner known per se, the reaction plate of a clutch. Thus this second element 14 is arranged to be mounted on the input shaft of the gearbox, for rotation with the latter, through a friction disc of the clutch, the friction liners of which are arranged to be gripped between the reaction plate 26 and a pressure plate, not shown, which is part of a clutch mechanism arranged to be attached, through its cover plate, by means of threaded fasteners, one of which can be seen in the upper part of FIG. 1 on the reaction plate 26.

The outer edge 46 of the internal disc 42 includes external radial lugs 50 which are arranged to serve as abutments for the ends of the springs of the resilient damping device 32.

Thus the springs, which bear on the pads 81 and the embossed portions 82 of the disc 34, in this example through interposed thrust pads 83 in a manner known per se, are adapted to be compressed by the lugs 50 penetrating into the housing 30. It will be noted that antiwear members 82, which are channel-shaped in this example, are interposed radially between the springs 32 and the skirt portion 22.

The peripheral portion of the disc 42 extends between a facing surface portion 52 of the plate 20 and a facing surface portion 54 of the internal radial disc 34 of the rotating element 12.

Thus the lugs 50 penetrate into the housing 30, with a slight gap being left between the plate 20 and the disc 34 to allow for penetration by the disc 42.

The internal sealing of the annular housing 30, and its separation from the annular space 36, is obtained by means of two sealing rings 56A and 56B.

The two rings 56A and 56B are two annular components which are press-formed and embossed from sheet metal, and they close the housing 30 at its inner periphery, the said housing being partly filled with grease for lubricating the springs of the device 32.

Figure 2:
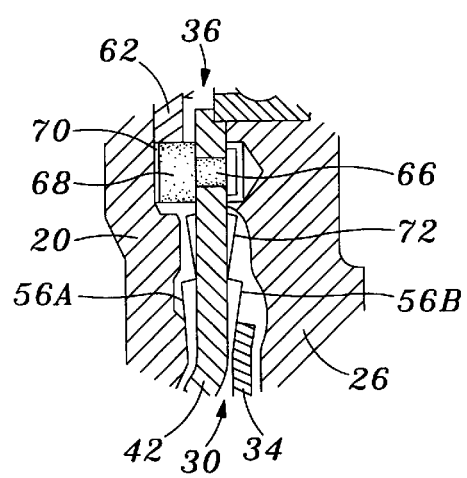
FIG. 2 is a view on a larger scale of the detail A in FIG. 1.

As can be seen in FIG. 2, the outer radial edge of the ring 56A cooperates with, and is in resilient engagement against, a support surface which is formed, in facing relationship with it, in the plate 20 of the first rotating element 12, while the outer radial edge of the second sealing ring 56B cooperates with, and is in resilient engagement against, a support surface formed, in facing relationship with it, on the disc 34 of the first rotating element 12.

The rings 56A and 56B are disposed, in accordance with the invention, on either side of the disc 42, and are backed on to the latter.

The damped flywheel 10 further includes a friction damping device 58 of known structure. This device 58 surrounds the hub 1 3 and comprises a first part 60 consisting of a ring of friction material, which is arranged to engage frictionally on a portion of the flat surface 38 of the plate 20 of the first element 12, and through a second part 62 that consists of a ring, of metal in this example, which is driven in rotation, optionally after a clearance has been taken up, by the second rotating element 14. A resilient ring 64, which biasses the ring 62 resiliently into engagement against the friction ring 60, is also provided.

The ring 64, which is of the Belleville ring type but which in another version is a ring of the corrugated ring type, bears on a flat ring which is located axially on the inner bearing ring of the rolling bearing 20 mounted on the hub 1 8. This hub 1 8 is formed with through holes, for receiving threaded fasteners whereby the flywheel is fastened on the crankshaft of the engine. One such threaded fastener can be seen in the central part of FIG. 1.

The flywheel is thus arranged operatively between two rotating assemblies, one of which (the crankshaft) is coupled to the internal combustion engine while the other is coupled to the input shaft of the gearbox.

The ring 60 is fixed on the ring 62, adhesively in this example. The ring 60 is thus arranged to be gripped axially between the ring 62, which constitutes a spacing ring, and the said portion of the surface 38.

In accordance with the provisions of the invention, the ring 62 is driven in rotation by the heads 68 of a set of rivets 66 which are fixed on the internal annular disc 42 of the second rotating element 14.

In accordance with the invention, and as can be seen in FIG. 2, the inner radial edge 70 of the sealing ring 56A is gripped between the head 68 of each rivet 66 and the flat surface portion, in facing relationship with it, of the annular disc 42 of the second rotating element 14.

In this way and in accordance with the invention, the first sealing ring is fixed on the disc 42.

The internal radial edge 70 also has, for this purpose, a set of corresponding holes through which the shanks of the rivets 66 extend.

This arrangement not only enables the ring 62 to be driven in rotation, but also provides fastening of the sealing ring 56A on the annular disc 42, and therefore on the second rotating element 14, the annular housing 30 being sealed by virtue of the cooperation of the internal radial edge of the ring 56A with a support surface arranged on the annular disc 42 in facing relationship with it.

This design enables the sealing ring 56A to be mounted and fastened on the annular disc 42 of the second rotating element 14 before the annular disc 42 is fixed on to the plate 26 of the second rotating element 14 by means of the set of coupling rivets 44.

Preferably in accordance with the invention, these rivets 44, which are distinct from the rivets 66, provide fastening for the disc 42 only, without providing fastening for the sealing ring 56A, which is thus improved.

The second sealing ring 56B is preferably fixed in the same way as the ring 56A, by means of the fastening members 66.

The internal radial edge 72 of the ring 56B is accordingly gripped between the foot of each rivet 66 and the portion of the disc 42 which is in facing relationship with it.

This internal radial edge 72 has holes through which the shanks of the rivets 66 extend.

Thus the radial edges of the sealing rings 56A, 56B extend in contact with the disc 42 on either side of the latter, and the assembly constitutes an assembly which can be handled and transported, and which cannot be lost.

As can be seen in FIG. 3, the fastening rivets 66 and the coupling rivets 44 are preferably arranged substantially on a common pitch circle, and are disposed alternately at regular spacings along this circle.

In the embodiment shown in the drawings, the internal radial edge 72 of the sealing ring 56B cooperates sealingly, by resilient engagement, with a support surface formed in facing relationship with it on the annular disc 42 of the second rotating element 14, thus providing sealing for the housing 30.

In another embodiment which is not shown in the drawings, it is possible to arrange that the sealing ring 56B is also fixed to the second rotating element 14, by clamping its internal radial edge 72 between the internal annular disc 42 and the flat surface portion 40 formed on the plate 26 and facing towards it.

It will be noted that the second rotating element 14 is formed with recesses, which face towards the feet of the rivets 66 in order to accommodate the said feet, with the disc 42 enabling the outer bearing ring of the bearing 28 to be located between a shoulder of the second element 14 and the inner periphery of the disc 42, which has a central hole.

In this connection, it will be recalled that, during the operation of the damped flywheel, the springs of the device 32 are caused to be compressed between the arms 50, the pads 81 of the plate 20, and the embossed portions 80 of the disc 34 of the first rotating element 12. During this movement, the head 68 of the rivets drives in rotation the ring 62 which drives the ring 60, so as to produce friction by contact with the surface 38.

The present invention is of course not limited to the embodiment described. In particular, the ring 62 could, as disclosed in the document FR-A-2 687 442, be coupled in rotation to the hub 18 by a coupling of the splined type, with the said ring 62 then having, at its inner periphery, teeth which are engaged, optionally with a clearance, in splines which are formed on the outer periphery of the hub 18.

In another version, the mounting of the ring 62 in rotation on the hub 18 may be obtained by means of flats.

The ring 60 would then have, at its outer periphery, slots for penetration of the heads 68 of the rivets into them, and for driving the ring 60 in rotation, optionally after a clearance has been taken up, by means of the second rotating element. This is made possible by the form of the head 68, which is relatively long and in the form of a spigot.

Similarly in FIG. 1, the ring 60 may be fitted over the plate 20 and not over the ring 62. Friction then takes place between the rings 60, 62. It is of course possible to mount the ring 60 freely between the plate 20 and the ring 62.

The form of the rings 56A, 56B may be different, given that the said rings are here arranged to be fixed, preferably, at their outer periphery on the disc 42 by means of the rivets 66, while through their outer periphery they are adapted to engage respectively on the plate 20 and on a support surface formed at the inner periphery of the disc 34.

The said rings 56A, 56B are then in engagement through their outer radial edge against a first support surface which is associated with the first rotating element. The said rings 56A, 56B are in engagement through their inclined radial edge against a second support surface which is offered by the disc 42 associated with the second rotating element 14.

It will be noted that in the drawings, the inner periphery of the rings 56A, 56B is offset axially with respect to the outer periphery of the said rings.

There is a clearance between the disc 42 and the outer periphery of the sealing rings.

The number of rivets 66 does of course depend on the application. A plurality of rivets 66 are preferably employed.

We claim:

1. A damped flywheel (10) arranged operatively between two coaxial rotatable assemblies (12, 14), one of which is adapted to be coupled to an internal combustion engine of a propulsion unit, the other one being adapted to be coupled to the input shaft of a gearbox of the propulsion unit, and comprising a first rotating element (12) and a second rotating element (14), which are coaxial and have the general form of parallel plates (20, 26) that define between them an annular housing (30), which is delimited mainly by the first rotating element (12) and which is disposed radially towards the outside and receives a circumferentially acting resilient damping device (32) a lubricating agent for the said device (32), and an annular space (36) arranged radially towards the inside, which receives an axially acting friction damping device (58), and sealing means which separate the annular housing (30) and space (36), and which comprises two coaxial sealing rings (56A, 56B), each of which is in engagement through one of its faces against a first support surface associated with the first rotating element (12), and through the other one of its faces against a second support surface associated with the second rotating element (14), wherein the second rotating element (14) comprises an annular disc (42) which extends into the annular space (36) and which penetrates through its outer periphery into the annular housing (30), characterised in that the friction damping device (58) comprises a part (62, 60) which is driven in rotation by the second rotating element (14) through at least one interposed head (68) of a member (66) for fastening one (56A) of the sealing rings (56A, 56B) on to the annular disc (42) of the second rotating element (14), and in that the annular disc (42) of the second rotating element (14) is fixed on the said second element (14) by means of a set of coupling members (44) which are distinct from the fastening members (66).

2. A damped flywheel according to claim 1, characterised in that the opposed annular faces of one of annular disc (42) constitute the said second support surfaces, and in that the fastening member (66) is mounted on the annular disc (42).

3. A damped flywheel according to claim 2, characterised in that the fastening member (66) is a rivet.

4. A damped flywheel according to claim 2, characterised in that the internal radial edge (70) of one of said sealing rings (56A) is gripped between the head of the fastening member (66) and the second support surface with which it cooperates.

5. A damped flywheel according to claim 2, characterised in that the body of the fastening member (66) extends through the internal radial edge (70) of the said sealing ring (56A).

6. A damped flywheel according to claim 1, characterised in that a set of members (66), spaced apart circumferentially, are provided so as to fasten the said sealing ring (56A), and their heads (68) drive in rotation the said part (62) of the friction damping device (58).

7. A damped flywheel according to claim 1, in which the sealing rings (56A, 56B) are disposed on either side of the annular disc (42) of the second rotating element (14), characterised in that one of the sealing rings (56B) is fixed on the annular disc (42) of the second rotating element (14) by means of fastening members (68), the internal radial edge (72) of said one of said sealing rings (56B) being gripped between the foot of the fastening members (66) and the second support surface with which it cooperates.

8. A damped flywheel according to claim 6, characterised in that the annular disc (42) is fixed to the second rotating element (14, 26) in the form of a plate, by means of a set of coupling members (44) which are spaced apart circumferentially.

9. A damped flywheel according to claim 8, characterised in that the coupling members (44) and the fastening members (66) are located substantially on a common pitch circle.

10. A damped flywheel according to claim 8, characterised in that the coupling members (44) are rivets.

* * * * *